United States Patent Office 3,331,658
Patented July 18, 1967

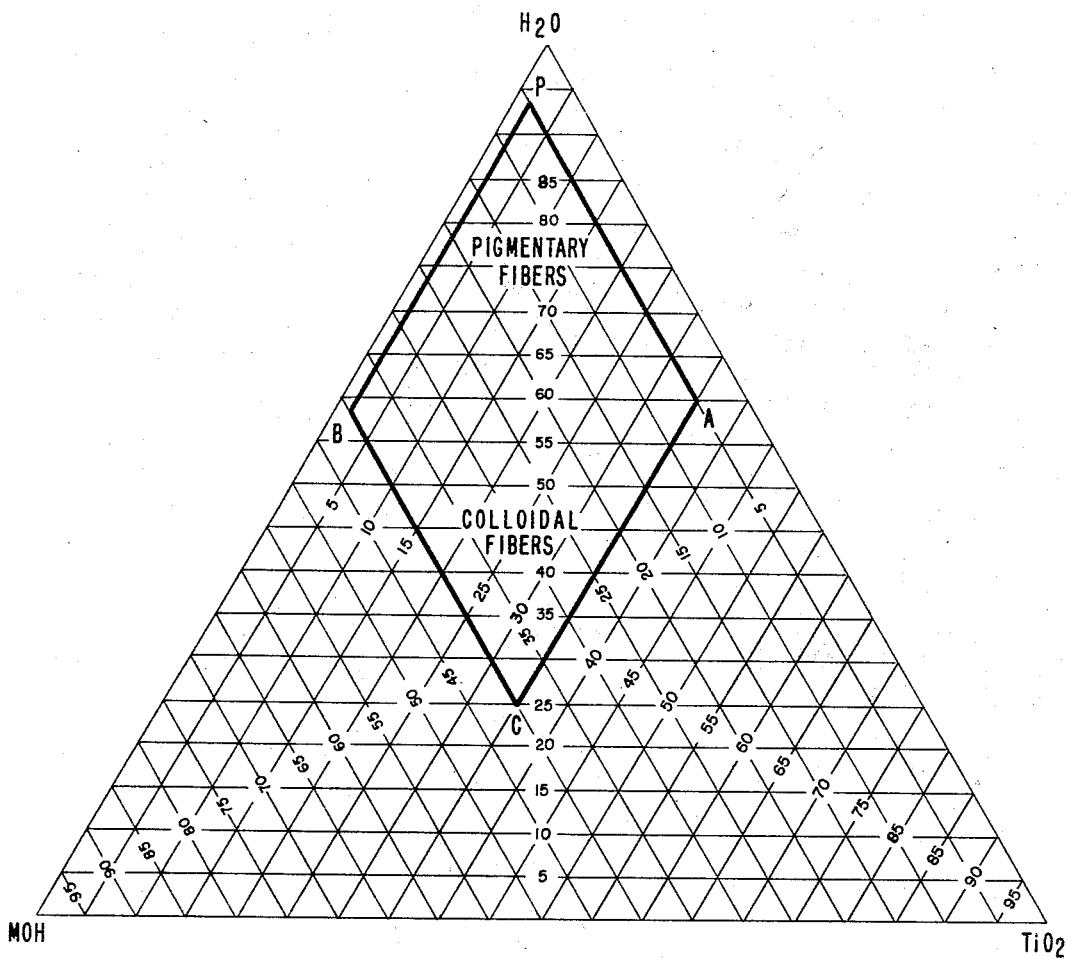

3,331,658
PROCESS FOR PRODUCING FIBROUS ALKALI METAL TITANATES
George Leoutsacs Lewis, Wilmington, and Donald M. Sowards, Claymont, Del., assignors to E. I. du Pont de Nemours and Company, Wilmington, Del., a corporation of Delaware
Filed Nov. 14, 1963, Ser. No. 323,710
9 Claims. (Cl. 23—51)

ABSTRACT OF THE DISCLOSURE

Fibrous, insoluble alkali metal titanate, obtained by reacting in the liquid phase at temperatures ranging up to 373° C. and under pressures ranging up to 216 atmospheres, a mixture of a basic, water-soluble alkali metal compound (oxide, carbonate, bicarbonate, hydroxide) and an oxygen-containing titanium compound (salts, $TiO_2$, rutile, ilmenite), employing sufficient titanium and alkali metal compounds to provide a solution with a pH of at least 12.5 and a weight ratio of titanium compound (as $TiO_2$) plus the weight of alkali metal compound (as MOH), to the weight of water present of from 0.075 to 3.

---

This invention relates to a new and improved process for preparing fibrous, water-insoluble alkali metal titanates. More particularly, this invention relates to a new and improved process for preparing fibrous, water-insoluble alkali metal titanates that is carried out at low temperatures and at least autogenous pressures by treating titania with an aqueous solution of alkali.

Water-insoluble, fibrous alkali metal titanates having the formula $M_2O(TiO_2)_n$ where M is an alkali metal of atomic number of at least 11, and $n$ is a number of from 4 to 7 and their preparations are disclosed in U.S. Patents Nos. 2,833,620 and 2,841,470. The tetra and hexatitanate of sodium, potassium, rubidium and cesium exhibit unusual stability toward aqueous solutions of acids, alkalies and to halogens. U.S. Patent No. 2,833,620 describes a reaction of an alkali metal hydroxide or carbonate with titanium dioxide under aqueous conditions particularly above the critical temperature and pressure of water, that is, above 400° C. and at pressures of at least 200 atmospheres in preparing hexatitanates, wherein $n$ is essentially 6 in the above formula. U.S. Patent No. 2,841,-470 discloses a low pressure, high temperature process in which a fused alkali metal halide or halide mixtures in temperatures up to 1200° C. is saturated with $TiO_2$ or a non-fibrous titanate having the formula $M_2O(TiO_2)_{2n}$ wherein M is an alkali metal and $n$ is 2 to 3, until fibrous tetra or hexatitanates are formed. Titanates prepared by these methods have fibrous structures in which one dimension of the crystal is longer than the other by a factor of at least 5 and up to 1000 or more, and because of their fibrous character they are useful in reinforcement or insulation applications which require inertness and physical properties of an asbestos-like material.

The prior art processes for the production of alkali metal titanates require either high temperatures or both high temperatures and high pressures. Thus, temperatures of about 800–1200° C. are required in the fused salt process, while temperatures of 400–700° C. in combination with pressures of the order of 1000–4000 atmospheres are required in the aqueous process where no liquid water is present in the reaction mixture. Therefore, in both processes, special types of apparatus must be resorted to because of the unusually high degree of corrosion which would be experienced with standard equipment used with high temperature salt fluxes and, of course, high pressure processes require expensive pressure type apparatus.

It is an object of this invention to provide an improved process for preparing fibrous, water-insoluble alkali metal titanate having the general formula $M_2O(TiO_2)_n$ wherein M is an alkali metal of atomic number of at least 11, and $n$ has a value of from 4 to 8. Still another object of this invention is to provide a process for preparing alkali metal titanates wherein substantially no corrosion of the apparatus occurs using standard equipment. Another object of the invention is to provide a continuous process for preparing fibrous alkali metal titanates that can be carried out in relatively simple pressure equipment. Another object is to provide a process where the rate of formation of the alkali metal titanate is increased and is faster than the fused salt procedure. A further object of the invention is to provide an improved process for controlling fiber dimensions and length. These and other objects and advantages of the invention will become more apparent upon reference to the following specification, claims and drawing.

It has been discovered that water-insoluble, fibrous alkali metal titanates can be prepared by reacting in a liquid phase a titanium-oxygen compound, preferably a titanium oxide or hydrated oxide, with an alkali metal oxide or a suitable basic metal compound, such as the carbonate or hydroxide in the presence of liquid water at conditions below the critical temperature and critical pressure of water.

It has further been found that when this reaction is carried out in the liquid phase in the presence of liquid water the process conditions are adjusted so as to maintain a reaction temperature within the range of from about 100–373° C. and under low autogenous pressures of from about 1 to 216 atmospheres (14.7 to 3174 lbs./sq. in.), preferably, 180 atmospheres (2650 lbs./sq. in.). Optimum results are produced when the temperature is maintained between a range of from 225–350° C. with pressures of from 34 to 136 atmospheres (500 to 2000 lbs./sq. in.). The pressure at a specific reaction temperature is regulated so as to maintain a liquid phase reaction. Under the preferred conditions the reaction is 90% complete within 15 minutes to 2 hours. Generally, the temperature has a greater effect on the course of reaction than the pressure and, at temperatures below 225° C. the reaction and fiber formation are very slow.

The titanium used in the process can be any oxygen-containing titanium compound. Suitable titanium compounds that can be utilized are titanium oxide or a salt thereof, for example, $TiO_2$ pigment, either anatase or rutile, raw hydrated titania (orthotitanic acid) such as a wet filter cake containing 2–5% sulfuric acid made by the conventional sulfate process for preparing $TiO_2$ pigment, flue dust containing $TiO_2$, rutile ore, beneficiated ilmenite, or solutions of titanium-oxygen compounds such as titanyl sulfate, or titanyl chloride. Of course, the reactivity of titanium will vary with the particular source and consequently, the time and temperature characteristics for the process will vary slightly.

The alkali metal oxides that are used in this invention are water-soluble basic oxygen-containing alkali metal compounds wherein the alkali metal has an atomic number of at least eleven, for example, the alkali metal oxides, carbonates, bicarbonates or hydroxides or mixtures thereof of sodium, potassium, rubidium and cesium. Preferably, these compounds are added in sufficient concentration so that when the oxides are mixed with the titanium solution at room temperature the resulting solution will have a pH of 12.5 or above. More than one alkali metal compound can be used in the process. For example, a mixture of sodium carbonate and potassium hydroxide will yield a mixed alkali metal titanate of the type $Na_xK_{2-x}O(TiO_2)_{4-8}$ where $x$ is a number greater than 0 but less than 2. Mixtures of any of the alkali metal oxide compounds having an atomic number greater than eleven are compatible, and will yield alkali metal titanate fibers containing more than one alkali metal. Representative compounds such as, for example, NaOH, $Na_2CO_3$, KOH, $K_2CO_3$, CsOH, $Cs_2CO_3$, and RbOH, $Rb_2CO_3$, and other soluble salts, in conjunction with these compounds, are suitable in solutions preferably adjusted to a pH of about 12.5 or higher at room temperature. It might be mentioned that titanate fibers containing more than two alkali metals wherein each fiber contains the same proportionate number of atoms of each atomic species can be prepared by the process of this invention. These fibers may be represented by the general formula:

$$Na_wK_xRb_yCs_zO(TiO_2)_{4-8}$$

where the value of any one subscript $w$, $x$, $y$ or $z$ can be equal to 0 or a number less than 2, but the sum total of subscripts $w+x+y+z$ will always be 2 for the preferred fibrous tetra or hexatitanate.

The molar ratios of alkali metal oxide to titanium oxide ($M_2O/TiO_2$) can vary from 1:100 to 13:1 with the preferred ratio being from 1:10 to 3:1, calculated as alkali metal to titanium dioxide. Low ratios tend to form tetratitanate structures while the hexatitanate structure forms at higher ratios.

It is critical that the reaction of the present invention be conducted in the liquid phase in the presence of liquid water in order for the process to proceed satisfactorily. Therefore, in order to retain liquid water in the reaction medium under process conditions, i.e., reaction temperatures of from 100° to 373° C., it necessitates, in some cases, having pressures up to 180 atmospheres and in some instances 216 atmospheres. Water from any suitable source can be used because the presence of trace impurities in the water has little effect on fiber growth and the course of the reaction, however, it is preferable to use water of low mineral content since contamination by foreign ions in the crystal lattice can cause discoloration and changes in refractive index.

At the low temperatures employed in this invention for preparing alkali metal titanates, and especially sodium and potassium titanate fibers, the liquid water concentration in the reaction mixture has been found to be the governing factor in controlling fiber size. A graphical representation of the three-component system is illustrated in the single drawing. The limits of the invention are represented as that area within the intersections A, B, C and P. Units of the system are expressed as parts by weight $H_2O$, the $TiO_2$ equivalent in the titanium source, and the alkali metal hydroxide equivalent of the alkali metal source. Colloidal fibers are produced at lower concentrations of liquid water whereas pigmentary fibers are produced in regions of high liquid water content. Pigmentary fibers having a diameter of from 0.05 to 1 micron and a length of from 0.5 to 500 microns are formed in the regions where the parts by weight ratio of the total $TiO_2$ and equivalent alkali metal hydroxide content to liquid water $$\left(\frac{TiO_2+MOH}{H_2O}\right)$$

is from 0.075 to 0.5; and colloidal particles having a diameter of from 0.005 $\mu$ to 0.5 $\mu$ and lengths of from 0.05 $\mu$ to 50 $\mu$ are formed where the said ratio is from 1 to 3. Particle sizes are particularly difficult to control in those regions where the $$\left(\frac{TiO_2+MOH}{H_2O}\right)$$

weight ratio lies between 0.5 and 1.

The yield of fibers is a function of the alkali metal oxide concentration in the mixture. Best yields have been obtained when alkali hydroxides and carbonates are present in concentrations sufficient to produce at pH of at least 12.5, or higher, in the reaction mixture at room temperature. The source of $TiO_2$ also has an effect on yield. Reactivity of titanium-oxygen compounds appears to increase in the following order: rutile ore<beneficiated ilmenite ore<rutile $TiO_2$<anatase $TiO_2$<hydrated titania (raw $TiO_2$). For example, with process condition being equal ilmenite and rutile ore gave a yield of 80 and 85%, respectively, while anatase $TiO_2$ and raw $TiO_2$ yielded 90 and 95%, respectively, of pigmentary fibers.

Equipment needed for the invention is not complex and a simple pressure vessel which will withstand pressures up to, for example, about 2650 lbs./sq. in. at 350° C. and resist corrosion by strong caustic solutions is satisfactory.

For a clearer understanding of the invention the following specific examples are given. These examples are merely illustrative and are not to be construed as limitations of the invention.

*Example 1*

About 100 g. of solution containing 21 wt. percent $TiO_2$ and 1.8% $H_2SO_4$, 26.1 g. KOH, and 80 g. $H_2O$ $$\left(\frac{TiO_2+MOH}{H_2O}\right)=0.33$$

was added to a 300 ml. stainless steel shaker tube. The tube was shaken and heated while the internal temperature was observed by means of a thermocouple. The temperature was maintained at 245° C. for about 25 minutes, an autogenous pressure of about 540 p.s.i. was generated and the tube was then cooled to 150° C.

The resulting paste was dispersed in water, filtered and washed with water to yield 23 g. of fibers (96% yield). A sample of the solids was viewed in the electron microscope and found to contain fibrous particles ranging in diameter from 0.01 $\mu$ to 0.05 $\mu$ and of lengths of 0.5 to 40 $\mu$. A portion of the sample was dried and found by chemical analysis to contain 83.6% $TiO_2$ and 13.6% $K_2O$. The following d-spacings (A) obtained for the sample via X-ray analysis shows the product to be potassium hexatitanate: 4.48, 3.67, 3.04, 2.98, 2.97, 2.70, 2.64, 2.58, 2.10, 2.08, 1.90 plus other lines.

*Example 2*

About 100 g. of solution containing 21 wt. percent $TiO_2$ and 1.8% $H_2SO_4$, 21 g. NaOH, and 80 g. $H_2O$ $$\left(\frac{TiO_2+MOH}{H_2O}\right)=0.31$$

was placed in a 200 ml. stainless steel shaker tube and processed as outlined in Example 1. About 22 g. (93% yield) of fibers averaging 0.09 micron in diameter with lengths of 1 to 50 microns were obtained. These fibers contained 88.6% $TiO_2$ and 10.1% $Na_2O$ as determined by chemical analysis and were further verified to be sodium hexatitanate fibers from their X-ray diffraction patterns which produced cell dimensions of $a_0=15.1$ A, $b_0=3.8$ A, $c_0=9.21$ A with $B=99.1$.

*Example 3*

The $Fe_2O_3$ was removed from a sample of ilmenite ore by treatment with hot chlorine. About 20 g. of this product, containing 98% $TiO_2$ was mixed with 23 g. KOH, 2 g. $K_2HPO_4$, and 150 g. $H_2O$ $$\left(\frac{TiO_2+MOH}{H_2O}\right)=0.28$$

The mixture was heated and shaken in a stainless steel tube. The temperature reached 330° C. after 30 minutes, an autogenous pressure of about 1850 p.s.i. was generated and the tube was then cooled for about 15 minutes to 150° C.

The excess salts were washed from the sample and a portion was viewed under the electron microscope. The product consists of long fibrous particles with diameters between 0.1 and 1.0 micron. It was shown to be potassium hexatitanate by virtue of the following d-spacings in its X-ray spectrum: 7.69, 6.41, 3.77, 3.67, 3.2, 3.04, 2.98, 2.97, 2.90, 2.65, 2.58, 2.10, 2.08, 1.90.

*Example 4*

A large quantity of the $Fe_2O_3$ was removed from a sample of ilmenite ore by leaching it with hydrochloric acid. About 30 g. of this product, containing 90% $TiO_2$, was mixed with 36 g. NaOH, and 130 g. $H_2O$ $$\left(\frac{TiO_2+MOH}{H_2O}\right)=0.54$$

The mixture was heated and shaken in a stainless steel tube. The temperature was maintained at 300° C. for 25 minutes, an autogenous pressure of about 1275 p.s.i. was generated, after which the sample was cooled to 150° C. for 10 minutes. A brownish-gray paste resulted. The excess KOH was washed from the product and a portion was observed in the electron microscope. The product consists of long fibrous particles of 0.5–1.0 μ diameter.

Chemical analysis indicates the product contained 87.95% $TiO_2$ and 10.73% $Na_2O$.

*Example 5*

About 600 g. of an aqueous solution containing 170 g. of hydrated $TiO_2$ and 15 g. $H_2SO_4$ was mixed with 300 g. KOH in a Teflon beaker $$\left(\frac{TiO_2+MOH}{H_2O}\right)=1.1$$

This mixture was placed in an autoclave and heated at 250° C., 725 p.s.i. pressure, for about 13 hours.

The resulting solid was leached by decantation and addition of distilled water, then acidified with 25% aqueous acetic acid. After filtering and washing with $H_2O$, a white paste resulted. This was found by electron microscopy to contain 200 g. of colloidal fiber-like particles with an average diameter of 0.005–0.075 μ and lengths of 0.05–0.5 μ for a yield of 90%.

After 3 days the paste developed a pH=10 indicating that all of the excess KOH had not been removed. A chemical analysis for $TiO_2$ content showed 77.4% confirming the presence of excess KOH in the potassium hexatitanate.

*Example 6*

By following the procedure of Example 5 using 300 g. of NaOH in place of KOH an 86% yield of colloidal sodium titanate was obtained. Fiber-like particles having diameters of 0.005–0.0075 μ and lengths of 0.05–0.5 μ with a $TiO_2$ content of 85% were obtained.

*Example 7*

About 1000 g. of solution containing 29 wt. percent $TiO_2$ and 2.5 wt. percent $H_2SO_4$ was mixed with 300 g. KOH $$\left(\frac{TiO_2+MOH}{H_2O}\right)=0.82$$

This mixture was heated in a Teflon beaker at 300° C., 1250 p.s.i. pressure for 12 hours.

The resulting product was dispersed in water and acidified with acetic acid. The product was filtered, rinsed with water, and a portion dried at 180° C. The dry product was found to contain 79% $TiO_2$, 17.5% $K_2O$.

The moist product was examined under the electron microscope and found to contain some particles identical to those of Example 1, in addition to some longer and shorter fibers. This product was identified as a mixture of potassium tetratitanate and potassium hexatitanate by comparison of its electron diffraction pattern with that of authentic samples.

*Example 8*

A stainless steel pot was charged with solution containing 15% $TiO_2$, 15% KOH, and 70% $H_2O$ $$\left(\frac{TiO_2+MOH}{H_2O}\right)=0.42$$

This mixture was heated in an autoclave to 300° C. for 18 hours and an autogenous pressure of about 1275 p.s.i. was generated.

The product was dispersed in water, neutralized, filtered, and washed with water. A sample was viewed under the electron microscope and found to contain fibrous particles with an average size of 0.4 μ diameter and 12.0 μ length. A portion of the product was dried at 300° C. and found by analysis to contain 83.6% $TiO_2$ and 14.6% $K_2O$.

*Example 9*

To demonstrate the effect of time on yield, a series of runs were conducted at the same temperature, varying the holding time, in a 3-gallon Hastalloy steel autoclave which was equipped with a low-speed anchor type agitator. A 6 liter charge containing 50 g./l. of anatase $TiO_2$ and 150 g./l, KOH in water suspension.

$$\left(\frac{TiO_2+KOH}{H_2O}\right)=.25$$

was heated at 325° C. for a controlled period of time and an autogenous pressure of about 1790 p.s.i. was generated. The mixture was then cooled to 150° C. within 30 minutes. Yield results were as follows:

TABLE I

| Hold time (minutes) at 325° C.: | Percent yield $K_2O(TiO_2)_6$ fibers |
|---|---|
| 5 | 5–10 |
| 15 | 80–90 |
| 30 | 90–95 |
| 60 | 90–95 |
| 120 | 95–98 |

The series of runs demonstrates as shown by the above table, that pigmentary particles of titanate fibers can be obtained in satisfactory yields within a period of 30 minutes and that little additional increase of yield is obtained after 15 minutes in most cases.

Fibrous alkali metal titanates of the formula $$M_2O(TiO_2)_n$$

wherein $n$ has a value of from 4 to 8 can be separated and obtained in a state free of unreacted starting materials by filtration followed by water-washing. The fibrous materials can be washed with dilute acid or base without change in their physical appearance. In some instances, where the reaction goes to completion stoichiometrically leaving little or no unreacted $TiO_2$ starting material in solution, the fibers can be easily drained and dried after a minimum of washing.

The following example illustrates a continuous process for producing fibrous alkali metal titanates.

*Example 10*

An agitated slurry heated to 80° C. containing 20 parts by weight of potassium hydroxide, 10 parts $TiO_2$ (added as orthotitanic acid or raw $TiO_2$) ($K_2O/TiO_2$ molar ratio=1/1) and the remainder water is pumped from a mixing tank and fed into a pipeline reactor. The caustic $TiO_2$ mixture is heated to 200° C. at 150 p.s.i.a. as it passes through a heat exchanger enroute to the reactor. A double check valve positive displacement pump conveys material from the heat exchanger to a scraped wall screw type pipeline reactor which is heated to 300°±25° C. while pressures of 1000±200 p.s.i.a. are maintained by the positive displacement pump. Residence time of material within the pipeline reactor is held at 20 to 30 minutes by regulating the speed of the screw. Fibrous potassium hexatitanate forms as reactants pass through the screw. When fibers reach the end of the reactor most of the unreacted caustic solution is pressed out to the extent that a semi-dry mass of fibers is emitted. The semi-dry mass of fibrous material is water-washed to remove unreacted caustic. Washings and caustic filtrate are recycled to the mix tank and reprocessed with additional caustic and $TiO_2$. Potassium titanate fibers produced continuously under the above conditions have an average length of 50 microns and an average diameter of 0.2 micron. These fibers of pigmentary size were used in papermaking. Paper of excellent opacity, bursting strength and improved quality especially for offset printing facilities, resulted from using fibrous potassium titanate as the pigment.

Both sodium and potassium hexatitanates are good white pigments because their refractive indexes are 2.37 and 2.3 respectively, which are close to values for anatase and rutile $TiO_2$, i.e., 2.52 and 2.7 respectively. Colloidal titanate fibers are employed as delustrants in polyethylene films. Other fibrous alkali metal titanates produced by this invention are useful as reinforcing agents in thermal, acoustical, electrical and ablative types of insulation.

What is claimed is:

1. A process for producing a fibrous, water-insoluble alkali metal titanate corresponding to the formula $M_2O(TiO_2)_n$ wherein M is an alkali metal selected from the group consisting of sodium, potassium, rubidium, cesium, and mixtures thereof, and $n$ has a value of from 4 to 8, which comprises reacting in the liquid phase in the presence of liquid water, at temperatures ranging from 225° C. to 350° C. and pressures ranging from 34 to about 136 atmospheres, a mixture of a basic, water-soluble oxygen-containing alkali metal compound selected from the group consisting of an oxide, carbonate, bicarbonate, hydroxide, and mixtures thereof, with an oxygen-containing titanium compound selected from the group consisting of a titanium salt, titanium dioxide, rutile ore and ilmenite, employing a sufficient concentration of titanium and alkali metal compounds in said mixture as will provide a solution having a pH of at least 12.5 and a weight ratio of titanium oxygen compound, calculated as $TiO_2$, plus weight of alkali metal compound, calculated as MOH, to the weight of water present of from 0.075 to 3, and then separating and recovering the desired fibrous, water-insoluble alkali metal titanate from the resulting reaction products.

2. The process of claim 1 in which the recovered titanate product consists of fibrous pigmentary particles having a diameter of from 0.05 to 1 micron and a length of from 0.5 to 500 microns, and the parts by weight ratio of total $TiO_2$ and equivalent alkali metal hydroxide content to liquid water employed in the reaction mixture is from 0.075 to 0.5.

3. The process of claim 1 in which the recovered titanate product consists of colloidal particles having a diameter of from 0.005 to 0.5 micron and lengths of from 0.05 to 50 microns, and the parts by weight ratio of total $TiO_2$ and equivalent alkali metal hydroxide content to liquid water employed in the reaction mixture is from 1 to 3.

4. The method of claim 1 wherein the alkali metal compound is an alkali metal hydroxide.

5. The process of claim 1 wherein the alkali metal compound is an alkali metal carbonate.

6. The process of claim 1 wherein the oxygen-containing titanium compound is hydrated $TiO_2$.

7. The process of claim 1 in which the alkali metal compound is sodium hydroxide, the titanium oxygen compound is $TiO_2$, said compounds being present in the reaction mixture in a molar ratio of from 1:10 to 3:1.

8. The process of claim 7 in which the alkali metal compound is potassium carbonate.

9. The process of claim 7 in which the alkali metal compound is potassium hydroxide.

References Cited

UNITED STATES PATENTS

| | | | |
|---|---|---|---|
| 1,697,929 | 1/1929 | Ryan | 23—51 |
| 2,111,460 | 3/1938 | Rockstroh | 23—51 |
| 2,140,236 | 12/1938 | Lederle | 23—51 |
| 2,218,655 | 10/1940 | Peterson | 23—51 |
| 2,833,620 | 5/1958 | Gier et al. | 23—51 |
| 2,841,470 | 7/1958 | Berry | 23—51 |

OSCAR R. VERTIZ, *Primary Examiner.*

H. T. CARTER, *Assistant Examiner.*